May 2, 1933.  A. KOSIK  1,907,397

PIPE JOINT

Filed Nov. 28, 1930

Inventor:
Adalbert Kosik

Patented May 2, 1933

1,907,397

UNITED STATES PATENT OFFICE

ADALBERT KOSIK, OF BEUTHEN, GERMANY.

PIPE JOINT

Application filed November 28, 1930, Serial No. 498,781, and in Germany August 18, 1930.

This invention relates to a flanged pipe or like joint and consists in the provision of a pair of abutting flanges each of which is formed integrally with a sleeve inserted into a pipe or the like and connected to the latter in known manner by rolling the pipe material into circumferential grooves in the sleeve. The metal surfaces are clamped together sufficiently for obtaining a tight joint. The flanges may be connected in the same manner by compressing a rim on one flange about the grooved edge of the other flange with or without the interposition of a packing member of soft metal, or a ring may be compressed about the abutting flanges and folded over the edges thereof.

The invention is illustrated in the accompanying drawing,

Figs. 1 to 5 representing sectional views of different forms of joints according to the invention.

Figure 1:
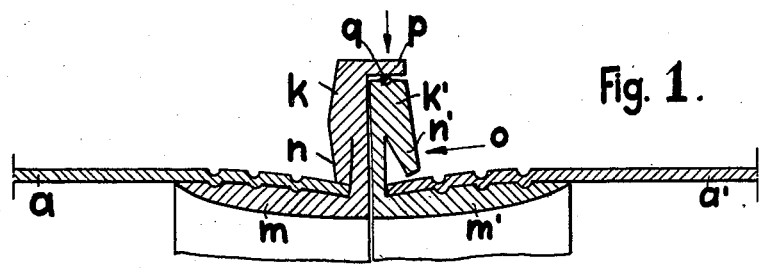

The flanges $k$ and $k'$ are formed integrally with sleeves $m$ and $m'$ on to which the expanded or normal pipe ends $a$ and $a'$ are slipped and then secured by rolling the pipe material in known manner into grooves formed in the sleeves. In order to render this joint as firm as possible, the sleeves are preferably tapered towards the flanges, and the pipe ends are first rolled down to fit the reduced parts of the sleeves, the fastening grooves being subsequently made. The flanges may be formed with lips $n$ and $n'$ respectively which are directed towards the pipe ends and normally set off from the flanges as shown at the right of Fig 1. These lips are subsequently rolled into position in the direction of the arrow $o$ against the flanges, the outer edges of the lips being pressed against the pipe ends as shown at the left of Fig. 1. A greater security against detachment of the flange is thus obtained. The sleeves $m$ and $m'$ may be enlarged instead of reduced near the flanges, as shown in Fig. 5, in which case the pipe ends are flared to correspond, the lips $n$ and $n'$ being subsequently pressed down against the flared pipe ends for securing the latter.

Flanges are principally applied to the pipes for connection to valves or other fittings provided with flanges. However, the flanges can also be used for connecting the pipes themselves as shown in the drawing. For this purpose the flange $k$ may, as shown in Fig. 1, be dished for the reception of the flange $k'$ and the overlapping rim $p$ is adapted to be rolled down against the edge of the latter flange. A packing ring $q$ of copper or the like is fitted in a groove in the edge of the flange $k'$ so as to be clamped between the elements for sealing the joint.

Figure 2:
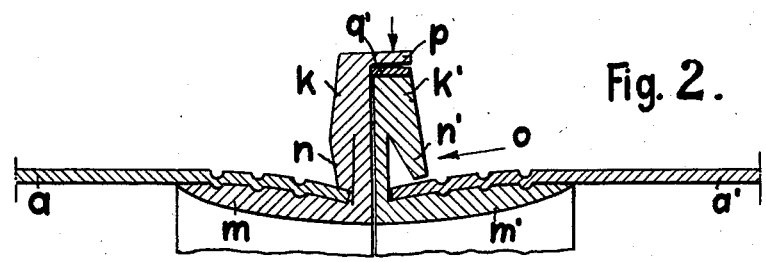
Figure 3:
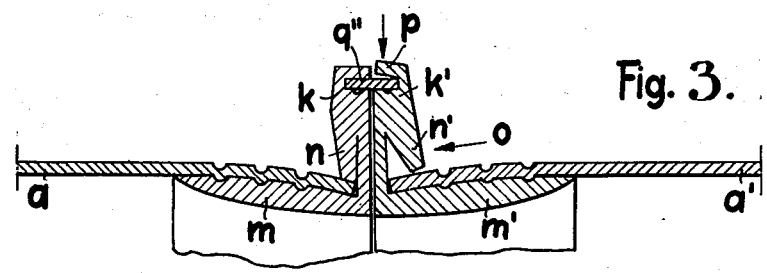

The round packing ring $q$ shown in Fig. 1 may be replaced by a flat ring $q'$ as shown in Fig. 2, and this ring may, as shown in Fig. 3, be accommodated in slits made in the flanges sufficiently near the circumference to allow the edges to be upset for securing the packing and the flanges in position.

Figure 4:
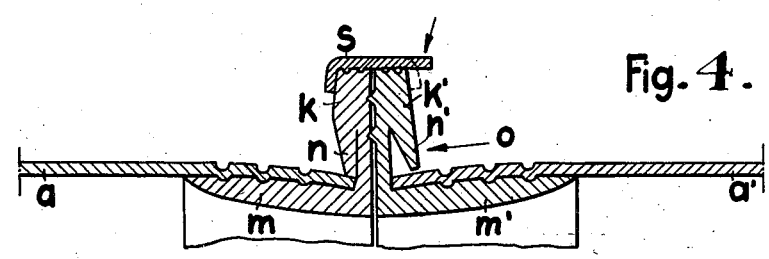
Figure 5:
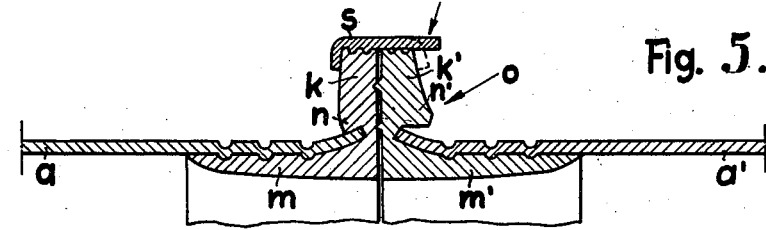

In the arrangement shown in Figs. 4 and 5 circumferential grooves are made in the edges of both flanges $k$ and $k'$, and the interconnection of the flanges is effected by means of a ring $s$ which is pressed into the grooves and which is in addition folded against the sides of the flanges by a suitable rolling operation. The flanges can in this case be separated if required by a cutting of the ring $s$ in alignment with the abutting sides of the flanges.

The inner and outer bearing surfaces of the pipes and of the connecting members must be cleaned and smoothened before the connection thereof. This is preferably effected by means of filing machines having short files and means for rotating such files about the different bearing surfaces until they are smooth and free from impurities. Adjustable milling rollers may be employed instead of files.

The rolling devices employed in the rolling process may comprise rollers which are interconnected in adjustable spacing by chains or links so that they can be closed up in proportion as the work progresses. This circumferential distance between the rollers is chosen with a view of preventing the material from buckling between the rollers. Thus the thinner the material the closer the rollers must be set. The cleaning as well as the rolling devices may be operated by hand or by power. The rollers may be mounted in chains and operated in the manner of known pipe cutters.

The subject matter of the invention is not restricted to the examples described and shown but extends to all other embodiments within the scope of the invention. Particularly in the construction and joining of pipes the novel joining method can be employed in various manners as a substitute for the usual riveting and screw connection. The method is applicable to pipes of different materials for instance iron, copper, aluminium, brass or the like. The grooves made in the pipes or in the connecting members may be of any desired cross section, for instance round, oval, triangular or trapezoidal, according to required rigidity and tightness.

I claim:

1. A flanged pipe joint comprising a pair of abutting flanges, a sleeve formed integrally with each flange and provided with circumferential grooves, and a pipe embracing each sleeve and formed with impressions engaging in said grooves to form a tight joint, each flange having an annular, continuous lip pressed into engagement with the extreme end of the pipe.

2. A pipe joint as claimed in claim 1 wherein the sleeves and pipes taper towards the flanges.

3. The pipe joint claimed in claim 1 in combination with a rim formed integrally with one flange and adapted to embrace the other flange, and means for forming a tight joint between said rim and the edge of the embraced flange.

4. A pipe joint according to claim 1 in combination with a rim formed integrally with one flange and adapted to embrace the other flange, and a packing ring of soft metal interposed betwen the rim and the edge of the embraced flange and engaging in a circumferential groove in the latter.

5. A pipe joint according to claim 1 in combination with a rim formed integrally with the flange and adapted to embrace the other flange, and a flat packing ring of soft metal interposed between the rim and the edge of the embraced flange and engaging in circumferential grooves in the latter.

6. A pipe joint as claimed in claim 1 wherein the extreme end of the pipe and the corresponding portion of the sleeve differs in diameter from the remainder of the structure.

7. The pipe joint claimed in claim 1 in combination with an annular connecting and packing member pressed into interengagement with both flanges.

ADALBERT KOSIK.